No. 774,030. PATENTED NOV. 1, 1904.
L. B. BENTON.
GRINDING MACHINE.
APPLICATION FILED MAY 5, 1900.
NO MODEL. 2 SHEETS—SHEET 1.

Witnesses:
Geo. W. Young
Chas. L. Goss

Inventor:
Linn Boyd Benton
By Wheeler, Henderson, Smith & Patten
Attorneys.

No. 774,030. PATENTED NOV. 1, 1904.
L. B. BENTON.
GRINDING MACHINE.
APPLICATION FILED MAY 5, 1900.
NO MODEL. 2 SHEETS—SHEET 2.
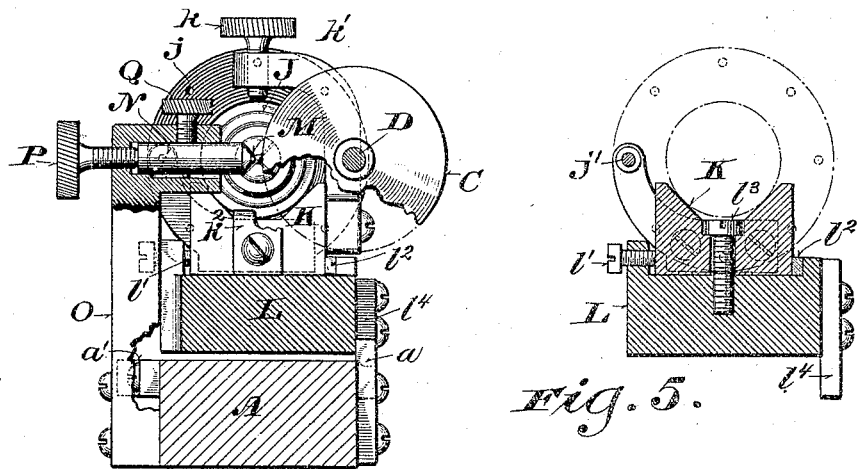
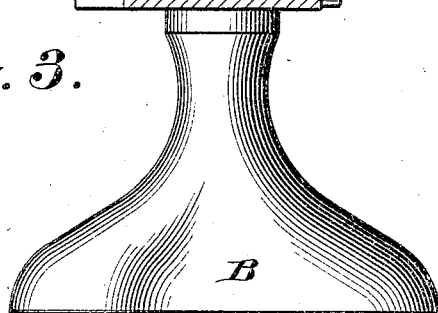
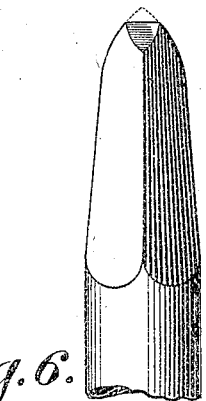
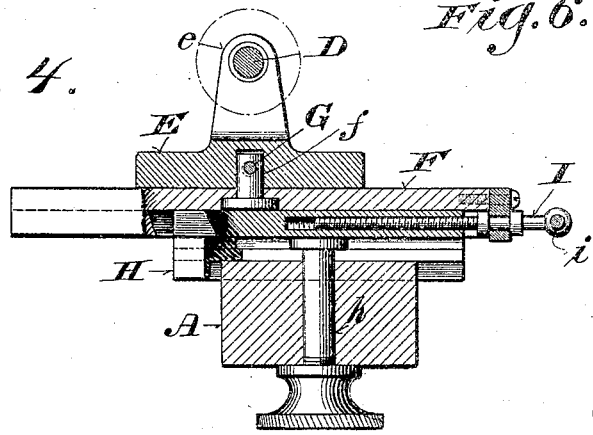

No. 774,030.                                              Patented November 1, 1904.

UNITED STATES PATENT OFFICE.

LINN BOYD BENTON, OF NEW BRIGHTON, NEW YORK, ASSIGNOR TO AMERICAN TYPE FOUNDERS COMPANY, A CORPORATION OF NEW JERSEY.

GRINDING-MACHINE.

SPECIFICATION forming part of Letters Patent No. 774,030, dated November 1, 1904.

Application filed May 5, 1900. Serial No. 15,593. (No model.)

*To all whom it may concern:*

Be it known that I, LINN BOYD BENTON, a citizen of the United States, residing at New Brighton, in the borough and county of Richmond and State of New York, have invented certain new and useful Improvements in Grinding-Machines, of which the following is a specification, reference being had to the accompanying drawings, forming a part thereof.

The main objects of my invention are to accurately and expeditiously shape and sharpen tools for engraving or other machines in which the tools are rotated, to shape or sharpen such tools in the center of rotation, so that when they are placed in the machines in which they are to be used they will not wabble, to shape or sharpen different tools or the same tool at different times exactly alike, so that when a tool is removed, sharpened, and replaced in the machine in which it is to be used or one tool is replaced by another a constant relation will be preserved between the cutting edges and working ends of such tools and the work upon which they are to operate.

It consists in certain novel features in the construction and arrangement of parts of the machine and in the combinations of parts hereinafter particularly described, and pointed out in the claims.

In the accompanying drawings like letters designate the same parts in the several figures.

Figure 1:
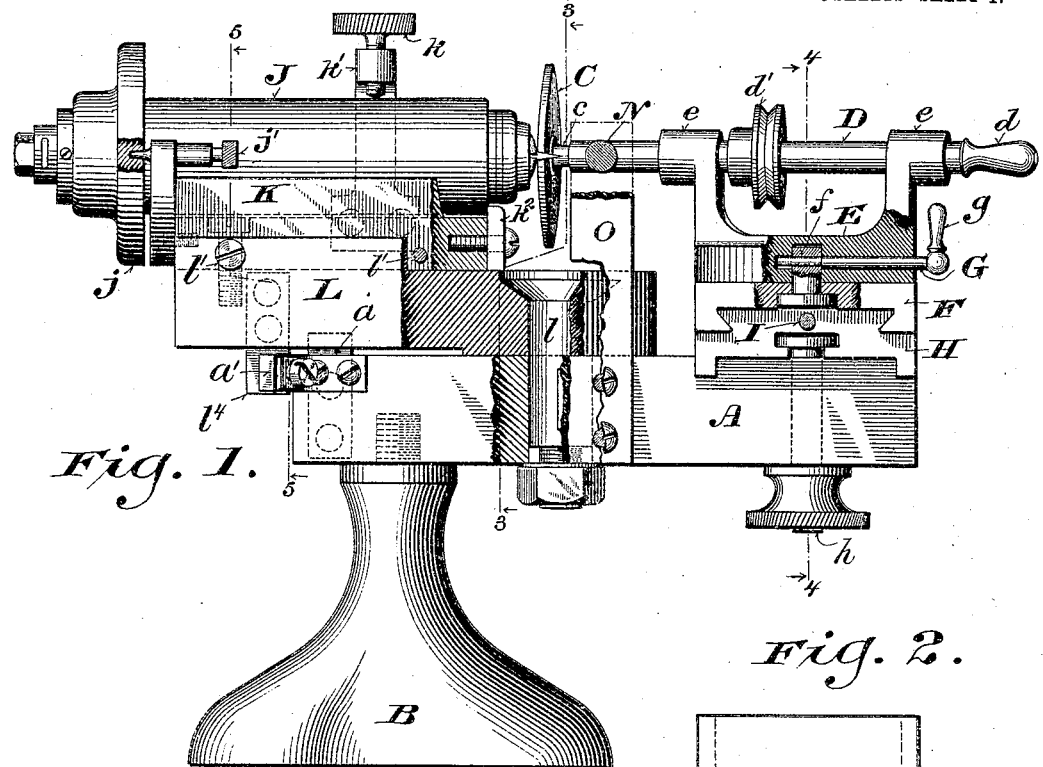
Figure 2:
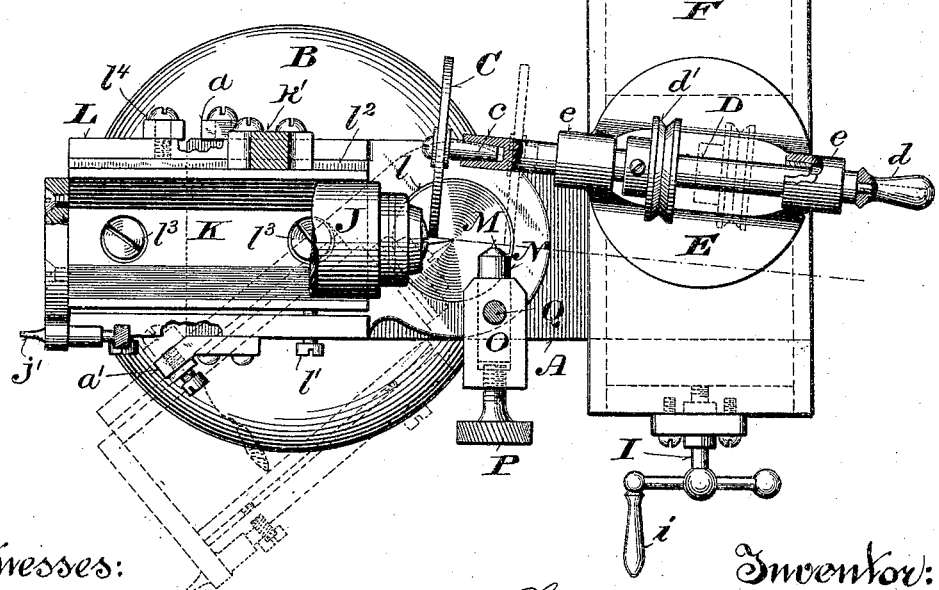

Figure 1 is a front or side elevation of a tool-grinding machine embodying my invention, certain parts of the machine being broken away and shown in section. Fig. 2 is a plan view of the machine, a portion of the tool-holder and other parts of the machine being broken away. Figs. 3, 4, and 5 are vertical cross-sections on the lines 3 3, 4 4, and 5 5, Fig. 1; and Fig. 6 is an enlarged view of one of the many forms of tools that may be shaped and sharpened on the machine herein shown and described.

A designates a bed which is supported on a standard B.

C is a grinding-wheel, which may be made of emery or of any other suitable abrading material. It is detachably fastened to one end of a rotary mandrel D by means of a tapered stem $c$, which is fitted in a correspondingly-tapered socket in the end of said mandrel, as shown in Fig. 2, or it may be fastened thereto in any other suitable manner. The mandrel D is fitted to freely revolve and move endwise in bearings $e\ e$ on a plate E. These bearings are preferably provided, as shown in Fig. 2, with hardened-steel bushings to avoid wear and play. At the end opposite the grinding-wheel C the mandrel is provided with a handle $d$, swiveled thereon for moving said wheel axially back and forth to and from and along its work. Between the bearings $e\ e$ said mandrel is provided with a pulley $d'$ for connecting it by a belt with a suitably-located driving-pulley.

The plate E is mounted upon a slide F and pivotally connected therewith by a pin $f$, the head of which is countersunk in the under side of said slide. This affords means for turning the plate E horizontally upon the slide and of changing the angular adjustment of the mandrel D with relation to the bed A and to the axis of the tool-holder mounted thereon and hereinafter described.

G is a round rod fitted to turn in a horizontal bore formed therefor in the plate E and intersecting the hole therein for the pivot-pin $f$. It is provided at its outer end with a handle $g$ and is formed at its inner end with an eccentric which engages a transverse hole in the pivot-pin $f$, as shown in Fig. 1. A quarter-turn of the rod G serves to clamp the plate E to the slide F, and thus lock the mandrel D in any angular position to which it may be adjusted. The slide F is mounted and movable transversely to the bed A upon a plate H, which is formed with a dovetailed tongue or way fitting into a corresponding groove or channel in said slide and is secured upon said bed by a screw and nut $h$.

I is a screw threaded in the plate H parallel with the tongue or way thereon and having a bearing in the slide F, as shown in Fig. 4. It is provided at its front or outer end with a crank-handle $i$, by means of which said slide with the grinding-wheel mounted thereon is moved backward and forward transversely to the bed A. The slide F with the plates E and H constitute an adjustable support for the grinding-wheel similar to the slide-rest of a lathe.

J is a quill for holding the tool or tool-blank to be sharpened or shaped in proper position to be operated upon by the grinding-wheel C. It is provided with a chuck or other suitable means for gripping and holding a tool or tool-blank axially therein; but as devices of this kind are common and well known it is not deemed necessary to illustrate and specifically describe any particular means for securing the tool or tool-blank in the quill.

K is a block adjustably mounted upon a plate L, which is pivotally attached at one end to the bed A by a bolt $l$, as shown in Fig. 1. It is formed on the upper side with a longitudinal V-shaped groove or recess, as shown in Figs. 3 and 5, and in this groove or recess the quill J is centered and clamped by a screw $k$, threaded vertically in a bracket $k'$, attached to one side of said block and overhanging the groove therein. The quill J is formed or provided at or near the end opposite that from which the tool or tool-blank protrudes with an index-plate or flange $j$, having a circular series of regularly-spaced holes with which a stop-pin $j''$, carried parallel with the spindle of the quill by an arm or bracket on the block K, is adapted to engage, as shown in Figs. 1 and 5, thereby determining the angular adjustment of the quill on its axis in the block K and holding it in its different angular positions for shaping or sharpening the several faces and edges of a tool exactly alike. The block K is provided at the end next to the rotary grinder C with a stop $k^2$, which determines the longitudinal position or adjustment of the quill and tool or tool-blank in the machine, and it is adjustably held between upwardly-projecting flanges on the sides of the swinging plate L by screws $l'$, threaded in one of said flanges and clamping said block against a metal stop $l^2$, interposed between it and the other flange. It is rigidly fastened in adjusted position to the plate L by screws $l^3\ l^3$, passing through transversely slotted or enlarged holes in the block K and threaded in the plate L, as shown most clearly in Fig. 5. By means of the fastenings above mentioned the axis of the quill J may be adjusted laterally or transversely to the bed A for grinding tools or tool-blanks of different sizes and shapes, stops $l^2$ of different thicknesses being provided for this purpose.

A stop $a$, attached to the back side of the bed A and projecting above it, as shown in Figs. 2 and 3, into position to engage with the back edge of the swinging plate L, arrests and holds said plate with the block K and quill J parallel with the bed A, as shown by full lines in Fig. 2. A stop $a'$, attached to the front side of the bed A, as shown in Figs. 1, 2, and 3, and adapted to engage with a stop $l^4$, attached to the back edge of the swinging plate L, arrests said plate in a position oblique to the bed A, as indicated by dotted lines in Fig. 2. The stop $a'$ is made adjustable, so as to arrest the swinging plate L and the tool-holder which it carries at any desired angle or at different angles to the bed A.

M is a diamond or other suitable hard substance that will without appreciable wear or change in itself cut the substance of the grinding-wheel C. It is so mounted and arranged with relation to said grinding-wheel and the tool-holder or work-support that as the grinding-wheel is worn away it will be exactly cut down to a true working face in a predetermined cutting-line, having a certain definite relation to the quill or tool-holder J. The several faces and cutting edges of the same tool or of different tools held in the quill J will therefore be shaped and sharpened by said grinding-wheel exactly alike, and when such tools are placed in the machine in which they are to be used their cutting edges will always have the same relation to the work on which they are to operate. The diamond or other hard-cutting substance is firmly set in the end of a rod or block N, which is adjustably held in a standard O, attached to the front side of the bed A, as shown in Figs. 2 and 3, and is held by said rod or block N and its supporting-standard O in the same horizontal plane with the axes of the grinding-wheel C and quill J and in the path of the periphery of said grinder as the latter is moved back and forth to and from the protruding end of the tool held in said quill. The rod or block N may be adjusted horizontally toward the grinding-wheel C by means of a screw P, threaded horizontally in the standard O and bearing at its point against the outer end of said rock or block, which is held from turning in said standard by a key or feather, as shown in Fig. 3. When adjusted to the desired position, the rod or block N carrying the diamond is secured in place by a set-screw Q, threaded in the standard O at right angles to the adjusting-screw P and bearing at its point against one side of said rod or block.

The machine as hereinbefore described operates as follows: The quill J in which the tool or tool-blank is held being clamped by the screw $k$ in the block K, with its inner end from which the tool or tool-blank protrudes snugly against the stop $k^2$ and the pin $j''$ inserted in the proper hole in the flange $j$ to present the face of the tool or tool-blank to be operated upon directly toward the grinding-wheel C, and the mandrel D being adjusted by turning the plate E to the proper position to give the desired angle or slope to the face and cutting edges of the tool, the slide F is moved forward by means of the screw I till the face of the grinding-wheel is brought into contact or line with the diamond M. The mandrel D is then moved lengthwise in its bearings $e$ by means of the handle $d$, and the working face of the grinding-wheel C is thus carried past the protruding end of the tool. As it is moved past the diamond to its work the periphery of the grinding-wheel will be trimmed and trued to bring it to a definite grinding or working line, which is determined by the adjustment of the diamond and the angle of the mandrel D to the bed A. When one face of the tool has been thus shaped, the screw $k$ is loosened, the pin $j''$ withdrawn from the flange $j$, the spindle of the quill J is turned an interval, according to the number of faces and cutting edges the tool is to have, and the pin $j''$ is again engaged with the proper hole in said flange for presenting another face on the tool or tool-blank to the grinding-wheel C. Another face is then formed on the tool by moving the grinding-wheel back and forth past the diamond, as above explained, the mandrel D being moved slightly forward toward the diamond as the face of the grinding-wheel is worn away, so that the same grinding or working line will be preserved in forming the several faces of the tool in succession. In the same manner different tools are shaped and sharpened with faces and cutting edges exactly alike. In case the tool is to be formed, as is usually the case, with curved faces or with straight and curved faces each straight face is formed in the manner above explained, while the axis of the quill or tool-holder J is held stationary at a constant angle to the cutting or working line of the grinding-wheel C by moving said grinding-wheel back and forth lengthwise of its axis along that part of the tool-blank or tool to be shaped or sharpened. A curved face is formed by swinging the quill or tool-holder J backward and forward with the plate L on the pivot-bolt $l$. The curve given to the faces of the tool is determined by the distance of the cutting or working line of the grinding-wheel from the axis of the pivot-bolt $l$. If a tool having a chisel-shaped end and curved edges on the sides next to the end, as shown in Fig. 6, is to be formed, a stop $l^2$ of the required thickness to make a chisel end of the desired width is inserted between the block K and the flange on the back of plate L. The thicker the stop $l^2$ the wider will be the chisel end. A shim of the required thickness is inserted between the shoulder on the quill J and the stop $k^2$, shims of different thicknesses corresponding with the stops $l^2$ being provided for different widths of tools having chisel ends, in order that the ends of such tools shall project the same distance from the shoulder on the quill J.

Tools of different diameters with chisel ends of different widths may be shaped and sharpened in this machine so that their straight faces and edges will have exactly the same angle to their axes, their curved faces and edges will have the same radius, and their chisel ends will project exactly the same distance from the quill or tool-holder J without using shims of different thicknesses between the stops $k^2$ and the shoulder on said quill or without adjusting the quill or tool-holder endwise. This is accomplished by adjusting the quill or tool-holder J at right angles to its axis away from the cutting or working line of the grinding-wheel for tools of greater diameters and wider chisel ends. Since the angle formed by the axis of the quill or tool-holder with the cutting-line of the grinding-wheel remains constant in adjusting the quill or tool-holder as last explained, for tools of different diameters it follows that the straight faces and edges of such tools will all have the same angle to their axes, and since the distance of the cutting or working line of the grinding-wheel from the axis of the pivot-bolt $l$ also remains constant the curved faces and edges formed next to the ends of tools of different diameters will have the same radius. For cutting off opposite corners and forming chisel ends on the tools the quill or tool-holder J is moved back toward the cutting or working line of the grinding-wheel into a certain position determined by a stop, such as $l^2$, or what would be its equivalent a stop interposed between the opposite side of the block K and the flange or an abutment on that side of the plate L. Since the cutting or working line of the grinding-wheel then intersects the axis or center line of the tool nearer the quill or tool-holder J than it did before, the corners of the tool will be taken off by the grinding-wheel as the latter is moved back and forth and the quill or tool-holder is swung forward against the stop $a'$, and a chisel end will be formed on the tool, as shown in Fig. 6. By setting the block K laterally on the plate L against the same stop to cut off tools of different diameters and swinging the quill or tool-holder with the plate L forward through the same angle to a certain point determined by the front stop $a'$ chisel ends are formed of different widths on tools of different diameters exactly the same distance from the quill or quills in which said tools are held, because the axes of the tools will all intersect the cutting or working line of the grinding-wheel at the same point and at the same angle when the quill or tool-holder with the plate L is swung forward against the front stop $a'$.

The several faces of the tool are first formed, as above explained, the shim is then removed, the shoulder on the quill J is set up against the stop, and opposite corners of the tool are ground off, thus producing a chisel end, as shown in Fig. 6.

Various changes in the details of construction and arrangement of parts to adapt the machine for the various uses to which my invention is applicable may be made in accordance with the principle and within the intended scope of my invention.

I claim—

1. In a grinding-machine, comprising a grinding-wheel movable lengthwise and crosswise of its axis, a pivoted support, and a work-holder adjustable transversely to its axis upon said support toward and from the cutting-line of said grinding-wheel; a stationary device arranged in the path of said grinding-wheel and adapted to preserve a constant relation between the cutting-line of said grinding-wheel and the pivot on which the work-holder and its support swing, substantially as described.

2. In a grinding-machine comprising a grinding-wheel movable lengthwise of its axis, and a work-holder; a device past which the grinding-wheel is moved to and from its work, arranged to preserve a constant relation between the cutting-line of said grinding-wheel and the work-holder, substantially as and for the purposes set forth.

3. In a grinding-machine comprising a work-holder, and a grinding-wheel movable lengthwise and crosswise of its axis; a device past which the grinding-wheel is moved to and from its work, arranged to preserve a constant relation between the cutting-line of said grinding-wheel and the work-holder, substantially as and for the purposes set forth.

4. In a grinding-machine comprising a work-holder, and a grinding-wheel movable lengthwise of its axis and capable of angular adjustment with reference to the work-holder; a device past which the grinding-wheel is moved to and from its work, arranged to preserve a constant relation between the cutting-line of said grinding-wheel and the work-holder, substantially as and for the purposes set forth.

5. In a grinding-machine comprising a work-holder capable of being turned upon its axis, means for holding it in the different positions into which it is turned, and a grinding-wheel movable lengthwise and crosswise of its axis; a device arranged in the path of the grinding-wheel as it is moved to and from its work and adapted to preserve a constant relation between the cutting-line of said grinding-wheel and the work-holder, substantially as and for the purposes set forth.

6. In a grinding-machine comprising a work-holder capable of swinging transversely to its axis, and a grinding-wheel movable lengthwise and crosswise of its axis; a device arranged in the path of said grinding-wheel as it is moved to and from its work and adapted to preserve a constant relation between the cutting-line of said grinding-wheel and the work-holder, substantially as and for the purposes set forth.

7. In a grinding-machine comprising a work-holder capable of angular adjustment on its axis and of swinging transversely thereto, means for locking said work-holder in different angular positions about its axis, and a grinding-wheel movable lengthwise of and transversely to its axis; a device arranged in the path of said grinder as it is moved to and from its work and adapted to preserve a constant relation between the cutting-line of said grinding-wheel and the work-holder, substantially as and for the purposes set forth.

8. In a grinding-machine comprising a work-holder capable of angular adjustment on its axis, and of swinging transversely thereto, stops for limiting its swinging movement, means for locking it in different angular positions about its axis, and a grinding-wheel movable lengthwise of and transversely to its axis, and capable of angular adjustment with reference to the axis of the work-holder; a device arranged to face the grinding-wheel to a determinate line of work when said wheel is moved transversely to its axis toward said device and advanced lengthwise of its axis toward the work-holder, substantially as and for the purposes set forth.

9. In a grinding-machine comprising a work-holder, and a grinding-wheel movable lengthwise of and transversely to its axis; a device adjustable transversely to the path of the grinding-wheel to and from its work and arranged to preserve a constant relation between the cutting-line of said grinding-wheel and the work-holder, substantially as and for the purposes set forth.

10. In a grinding-machine comprising a tool-holding quill, a supporting-block having a longitudinal V-shaped groove and provided with a clamping-screw for holding said quill centrally in said block, and a grinding-wheel movable lengthwise of and transversely to its axis; a device arranged to bring the face of said grinding-wheel to a predetermined line of work when it is moved toward said device and advanced toward said quill, substantially as and for the purposes set forth.

11. In a grinding-machine comprising a suitable bed, a swinging plate pivoted thereto, a tool-holding quill, a supporting-block mounted and transversely adjustable upon said plate and having a longitudinal V-shaped groove and a screw for clamping said quill in said groove, and a grinding-wheel movable transversely to and lengthwise of its axis; a device arranged to bring the face of said wheel to a predetermined working-line when it is moved transversely to its axis toward said device and advanced lengthwise of its axis toward said quill, substantially as and for the purposes set forth.

12. In a grinding-machine comprising a tool-holding quill having a circular series of regularly-spaced holes, a supporting-block having a longitudinal V-shaped groove and a radially-disposed screw overhanging said groove for clamping said quill therein, and provided with a locking pin or detent adapted to engage with the holes in said sleeve and to determine the angular position of the quill in said block, a swinging plate to which said grooved block is adjustably attached, and a grinding-wheel movable transversely to and lengthwise of its axis; a device arranged to bring the face of said wheel as it is worn to a predetermined line of work, substantially as and for the purposes set forth.

13. In a grinding-machine comprising a suitable bed of a tool-holder detachably mounted thereon, and a grinding-wheel mounted upon said bed and movable lengthwise of its axis toward and from said tool-holder; a device mounted on said bed in the path of said wheel to and from its work, and means of adjusting said wheel transversely to its axis, whereby as said wheel is worn away said device will bring its face down to a predetermined line of work and the several faces and edges of the same tool or of different tools will be shaped exactly alike, substantially as and for the purposes set forth.

In witness whereof I hereto affix my signature in presence of two witnesses.

LINN BOYD BENTON.

Witnesses:
M. F. BENTON,
WM. MORE.